July 9, 1929.     N. DE VITO     1,719,834
PISTON AND UPPER RING THEREFOR
Filed May 3, 1926
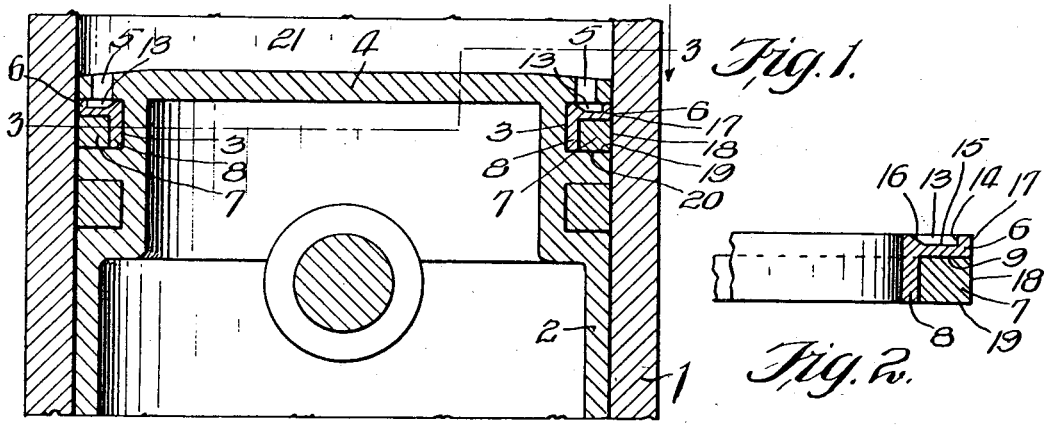
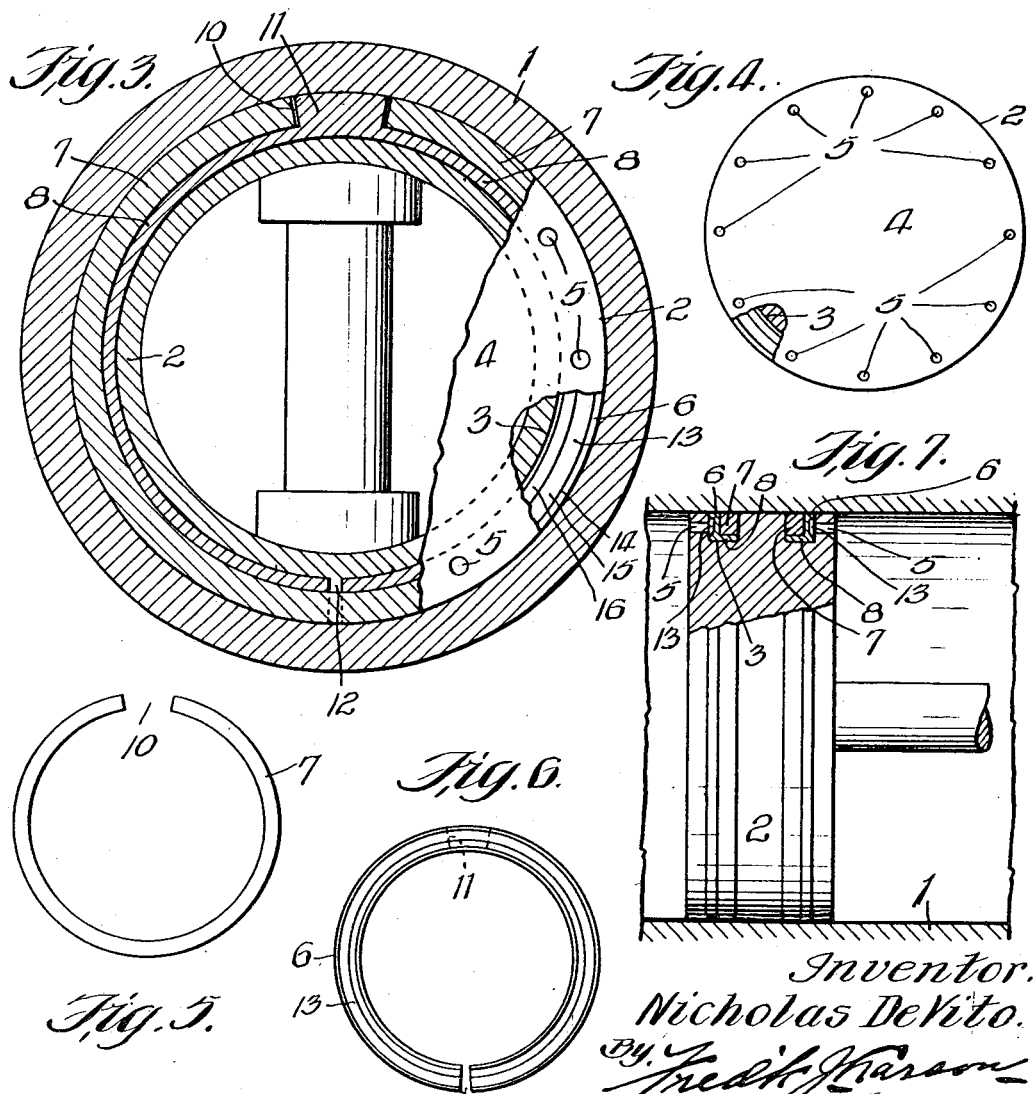
Inventor:
Nicholas DeVito.
By Fred'k J. Larson
Attorney.

Patented July 9, 1929.

1,719,834

UNITED STATES PATENT OFFICE.

NICHOLAS DE VITO, OF ST. LOUIS, MISSOURI.

PISTON AND UPPER RING THEREFOR.

Application filed May 3, 1926. Serial No. 106,413.

My invention relates to a piston and upper ring therefor, and, it is a distinct and practical improvement to overcome certain practical objections to, and defects in, the present type of piston and upper ring therefor.

The object of my present invention is the provision of a piston and upper ring therefor, which will permit the pressure within a cylinder to exert itself within an annular groove in the upper face of a two piece split piston ring for expanding the two piece split ring members to hold the bearing faces thereof in leak proof contact with the wall of a cylinder and to hold the lower face of the lower ring member in leak proof contact with the lower face of the ring receiving groove of the piston.

A further object of my invention is to provide a piston and upper ring therefor, which will possess advantages in points of simplicity and efficiency, and, at the same time prove itself comparatively inexpensive in cost of manufacture.

With the above and other objects in view, the invention consists in the novel features of construction, arrangement and combination of parts hereinafter more fully described and finally pointed out in the claim hereto appended.

Referring to the accompanying drawings forming a part of this specification, wherein like characters of reference denote similar parts throughout the several views:

Fig. 1, is a vertical sectional view of a portion of an engine cylinder provided with a piston and upper pressure actuated ring therefor in accordance with my invention.

Fig. 2, is a detail in section of a portion of the two piece ring.

Fig. 3, is a view partly in sectional elevation taken on line 3—3 of Fig. 1 and partly in top elevation.

Fig. 4, is a plan view of the piston.

Fig. 5, is a plan view of one of the piston ring members.

Fig. 6, is a plan view of the piston ring member having the annular pressure receiving groove in its upper face.

Fig. 7, is a view partly in sectional elevation and partly in side elevation of a steam piston showing a ring adjacent each end face of the piston.

Referring to the drawings, the reference numeral 1 represents an engine cylinder, while the numeral 2 represents a piston which is provided with the usual upper circumferential ring receiving groove 3.

The head 4 of the piston 2 is provided with a plurality of marginally arranged openings 5 which communicate at their lower ends with the upper ring receiving groove 3 so as to allow the pressure within the cylinder to exert itself, both in the explosion and compression strokes of the piston upon the upper ring member of a two piece piston ring carried in the grooves 3, which piston ring will now be described.

The piston ring consists of two ring members 6 and 7 which are upper and lower ring members, respectively. The upper ring member is right angular in cross-section due to the downwardly directed flange, or skirt 8 which is a continuation of the inner end of the ring member 6 and which provides the ring member 6 with an angular pocket 9 for the reception of the lower ring member 7 which is substantially square in cross-section.

The lower ring member 7 is split, or rather provided with a cutaway portion 10 to receive a lug 11 disposed in the pocket 9 and fixed to the upper ring member 6 to prevent rotary displacement of the two ring members 6 and 7 when assembled. The upper or angular ring member 6 is split, as at 12, directly opposite the center of the lug 11, as clearly shown in Fig. 3.

The upper face of the upper ring member 6 is provided with a suitable annular groove 13 preferably having the vertical outer face 14, the flat lower face 15 terminating at its inner end in an inclined face 16, which groove is disposed directly below the piston head openings 5 when the ring is placed in its receiving groove 3, as clearly shown in Figs. 1 and 3.

It will be apparent from the foregoing description that when the piston is reciprocated within its cylinder that the pressure within the cylinder will exert itself through the piston head opening 5 upon the upper ring member 6. As the pressure enters the annular groove 13 of the ring member 6, through the piston head openings 5, it will exert itself against the ring wall face 14 and the back of ring member 6 and the skirt 8 thereof thereby causing the outer face 17 of the ring member 6 and the outer face 18 of the lower ring member 7 to establish a leak proof contact with the wall of the cylinder and to also cause the lower face 19 of the lower ring member to establish a leak proof contact with the lower face 20 of the ring receiving groove 3 of the piston, thus preventing the leakage of pressure from the cylinder downwardly past the ring members 6 and 7 into the crank case of the engine in the downward stroke of the piston and to also prevent oil creepage upwardly from the crank case into the compression or expansion chamber 21 of the cylinder.

It is, of course, understood that my piston and ring is applicable to either internal combustion engines, or steam engines, and that in the case of locomotives, both ends or heads of the piston are to be provided with openings communicating with the annular facial groove of a ring disposed at both ends of the piston instead of but one end as with internal combustion engines.

The many advantages of the herein described invention will readily suggest themselves to those skilled in the art to which it appertains.

I do not wish to be understood as having limited myself to the specific details of construction shown and described, but desire to have it understood that the invention I have shown in the drawings is merely illustrative as it is manifest that various minor changes may be made in the exact construction and particular arrangement of parts without departing from the spirit of my invention, hence I reserve the right to make any such changes, or modifications as may fairly fall within the scope of the appended claim when fairly construed.

What I claim is:

In combination with a piston having ring grooves and having a plurality of openings leading through the head wall of the piston from one of the ring grooves, of a two piece piston ring receivable in the ring groove having communication with said openings, one of the ring members being a split member having a lug directly opposite the split in the ring and said ring member being right angular in cross section on opposite sides of the lug and square in cross section at the lug, a facial groove in said ring member communicating with the lower end of the piston head openings and the second ring member being a split member which is square in cross section and adapted to span the split of the first mentioned ring member and having its ends terminating adjacent opposite faces of the lug of the first mentioned ring member.

In testimony whereof, I have hereunto affixed my signature.

NICHOLAS DE VITO.